(12) United States Patent
Lorraine et al.

(10) Patent No.: US 9,261,222 B2
(45) Date of Patent: Feb. 16, 2016

(54) ANTI-KINKING DEVICE FOR GARDEN OR WATER HOSE

(75) Inventors: Steven Lorraine, Glastonbury, CT (US); Galen Sienicki, Goodyear, AZ (US)

(73) Assignee: Swan Holdings, LLC, Totowa, NJ (US)

( * ) Notice: Subject to any disclaimer, the term of this patent is extended or adjusted under 35 U.S.C. 154(b) by 265 days.

(21) Appl. No.: 13/309,164

(22) Filed: Dec. 1, 2011

(65) Prior Publication Data

US 2013/0133772 A1     May 30, 2013

Related U.S. Application Data

(63) Continuation-in-part of application No. 13/308,070, filed on Nov. 30, 2011.

(51) Int. Cl.
    *F16L 11/00*     (2006.01)
    *F16L 57/02*     (2006.01)
    *F16L 35/00*     (2006.01)

(52) U.S. Cl.
    CPC ............ *F16L 57/02* (2013.01); *F16L 35/00* (2013.01)

(58) Field of Classification Search
    CPC ................................. F16L 35/00; F16L 33/213
    USPC .......................... 138/109, 110; 285/115, 116
    See application file for complete search history.

(56) References Cited

U.S. PATENT DOCUMENTS

| | | | |
|---|---|---|---|
| 1,509,802 A * | 9/1924 | Weigand ................. 285/243 |
| 2,179,930 A * | 11/1939 | Harrington ............. 285/243 |
| 2,185,741 A | 1/1940 | Sorg et al. |
| 2,266,211 A | 12/1941 | Kaiser et al. |
| 2,295,840 A * | 9/1942 | Grint ..................... 285/258 |
| 2,562,116 A * | 7/1951 | Nelson ................... 285/258 |
| 2,640,502 A | 6/1953 | Powers |
| 2,825,588 A * | 3/1958 | Howard ................. 285/258 |
| 3,017,203 A * | 1/1962 | Macleod ................ 285/256 |
| D296,581 S | 7/1988 | Hattori et al. |
| 4,805,933 A * | 2/1989 | Swisher ............ F16L 35/00 285/115 |
| 4,867,485 A | 9/1989 | Seckel |
| 4,962,582 A | 10/1990 | Puls |
| 5,143,409 A | 9/1992 | Lalikos et al. |
| 5,181,750 A * | 1/1993 | Reum ................ F16L 35/00 285/115 |
| 5,315,748 A | 5/1994 | Seckel |
| 5,316,348 A | 5/1994 | Franklin et al. |
| 5,333,650 A | 8/1994 | Folkman et al. |
| 5,368,235 A | 11/1994 | Drozdoff et al. |
| 5,390,272 A * | 2/1995 | Repta et al. ............. 385/100 |

(Continued)

FOREIGN PATENT DOCUMENTS

GB     2091498 A   *   7/1982

*Primary Examiner* — Daniel R Shearer
(74) *Attorney, Agent, or Firm* — Novak Druce Connolly Bove + Quigg LLP

(57) ABSTRACT

There is disclosed an anti-kinking device having a neck portion having a threaded internal surface; and a coil portion connecting the neck portion and a terminal portion; wherein the coil portion has a central coil axis and comprises a plurality of spaced apart windings with open spaces between each winding in a relaxed state, each winding having a substantially cylindrical inner wall, a substantially cylindrical outer wall, and sidewalls connecting the inner and outer walls, the sidewalls having planar angled portions with respect to the coil axis. In an aspect, the device can have a terminal portion having a threaded internal surface. There is also disclosed a hose system comprising a hose inserted through the disclosed device. The device can prevent kinking of the hose.

3 Claims, 11 Drawing Sheets

(56) References Cited

U.S. PATENT DOCUMENTS

| | | |
|---|---|---|
| 5,498,043 A | 3/1996 | Goldenberg |
| 5,626,369 A | 5/1997 | Shifman et al. |
| 5,857,711 A | 1/1999 | Comin-Dumong et al. |
| 5,894,866 A | 4/1999 | Horst et al. |
| 5,996,639 A | 12/1999 | Gans et al. |
| 6,494,496 B1 * | 12/2002 | Sweeney ............... F16L 35/00 138/110 |
| D501,539 S | 2/2005 | Dyer et al. |
| D512,492 S | 12/2005 | Lipscomb et al. |
| 7,108,292 B2 | 9/2006 | Lipscomb et al. |
| 7,837,157 B2 * | 11/2010 | Linhart et al. ................. 248/71 |
| 8,205,804 B2 * | 6/2012 | Parker ...................... F16L 3/01 138/106 |
| D707,334 S | 6/2014 | Hernandez et al. |
| 2001/0003354 A1 * | 6/2001 | Cockayne ............... F16L 57/02 248/75 |
| 2004/0036285 A1 * | 2/2004 | Guivarc'h et al. ............. 285/319 |
| 2009/0165865 A1 * | 7/2009 | Parker ........................ 137/15.08 |
| 2012/0234424 A1 * | 9/2012 | Bernhardt ............. F16L 33/223 138/137 |

* cited by examiner

ANTI-KINKING DEVICE FOR GARDEN OR WATER HOSE

RELATED APPLICATIONS

This application is a continuation-in-part of U.S. patent application Ser. No. 13/308,070, filed Nov. 30, 2011, the disclosure of which is hereby incorporated by reference.

FIELD OF THE INVENTION

The present invention relates to garden or other types of hoses, and more specifically is directed to a device to prevent kinking of a hose.

BACKGROUND OF THE INVENTION

Flexible hose has been manufactured for many years, first out of natural rubber and more recently out of petrochemical derivatives such as synthetic rubber, thermoplastic rubbers or plastics. "Kinking" occurs when the hose is doubled over or twisted. Kinking also occurs due to the routine movements of the user. A consequence of kinking is that the fluid flow through the hose can be either severely restricted or stopped. Kinking is a nuisance, causing the user to waste time unkinking the hose.

Current garden and other types of water hoses may be provided with wire springs or solid plastic "wrenches" in an attempt to prevent kinking. However, when the hose is pulled hard at an angle, thereby putting strain on the hose, the hose kinks at the end of the spring. This also happens with the wrenches.

The conventional wire springs are attached to the ferrule of a garden hose by decreasing the diameter of the first coil of the spring. However, this makes it difficult to attach and remove from the ferrule. Additionally, the rigid wire springs are prone to corrosion because they are subjected to the outside elements, e.g., temperature and weather changes.

BRIEF SUMMARY OF THE INVENTION

In an aspect, there is provided an anti-kinking device for a hose system comprising a neck portion having a threaded internal surface; and a coil portion connecting the neck portion and a terminal portion; wherein the coil portion has a central coil axis and comprises a plurality of spaced apart windings with open spaces between each winding in a relaxed state, each winding having a substantially cylindrical inner wall, a substantially cylindrical outer wall, and sidewalls connecting the inner and outer walls, the sidewalls having planar angled portions with respect to the coil axis; wherein the device is a substantially cylindrical body having a through bore; and wherein the planar angled portions of the sidewalls engage to prevent the windings from slipping against each other when the windings are in a bent state.

In another aspect, there is also provided a hose inserted through the anti-kinking device; and a ferrule having a plurality of parallel concentric rings on the outer surface and attached to an end of the hose; wherein the threaded internal surface of the neck portion of the device is attached to the plurality of parallel concentric rings on the outer surface of the ferrule.

In a further aspect, there is provided a hose having a female end inserted through the anti-kinking device; and a coupler having a tail inserted into the female end of the hose; wherein the female end of the hose is crimped between the threaded internal surface of the neck portion of the device and the coupler.

Moreover, there is provided, in another aspect, a hose having a female end and a male end and inserted through two anti-kinking devices; wherein the terminal portion of each device is positioned towards a center of a length of the hose, and the neck portion of one of the two devices is positioned towards the female end of the hose and the neck portion of the second of the two devices is positioned towards the male end of the hose; a ferrule having a plurality of parallel concentric rings on the outer surface is crimped onto the male end of the hose; wherein the threaded internal surface of the neck portion of the second of the two devices is attached to the plurality of parallel concentric rings on the outer surface of the ferrule; and a coupler having a tail is inserted into the female end of the hose; wherein the female end of the hose is crimped between the threaded internal surface of the neck portion of one of the two devices and the coupler.

Further, there is provided a hose having a female end and a male end and inserted through an anti-kinking device comprising a neck portion having a threaded internal surface; and a coil portion connecting the neck portion and a terminal portion having a threaded internal surface; and a ferrule having a plurality of parallel concentric rings on the outer surface and attached to a female end of the hose; wherein the threaded internal surface of the neck portion of the device is attached to the plurality of parallel concentric rings on the outer surface of the ferrule.

BRIEF DESCRIPTION OF THE DRAWINGS

FIGS. 4-8 are a series of perspective views illustrating the steps of an assembly process for attaching the device of FIG. 1A to a hose, wherein FIG. 4 shows a hose inserted through the device of FIG. 1A;

FIG. 5 shows a ferrule having a plurality of parallel concentric rings on the outer surface attached to the hose assembly of FIG. 4;

FIG. 6 shows both the ferrule and a coupler at the end of the hose assembly;

FIG. 7 shows the device, a ferrule (not visible), and a coupler fully assembled on the end of the hose;

FIGS. 11A-D are a series of perspective views illustrating the steps of an assembly process according to another embodiment of the invention, for attaching two devices of FIG. 1A to a hose, wherein FIG. 11A shows a hose inserted through two devices;

FIG. 11B shows a ferrule having a plurality of parallel concentric rings on the outer surface attached to each end of the hose system of FIG. 11A;

FIG. 11C shows a ferrule at the male end of the hose, and a coupler at the female end, without a ferrule, according to another embodiment of the invention, of the hose system of FIG. 11A;

FIG. 11D shows the two devices, a ferrule (not visible on the male end of the hose), and a coupler, fully assembled at each end of the hose system;

FIGS. 12A-C are a series of perspective views illustrating the steps of an assembly process according to another embodiment of the invention for attaching the device of FIG. 10A to a hose wherein FIG. 12A shows a hose inserted through the device;

FIG. 12B shows a ferrule fully assembled at the male end of the hose, and a ferrule (on the female end is not visible) and coupler, fully assembled at the female end of the hose system;

FIG. 12C shows a device of FIG. 10A and a ferrule (not visible on the male end of the hose) fully assembled at the male end of the hose system, and a ferrule and a coupler fully assembled at the female end of the hose system;

DETAILED DESCRIPTION

Figure 1A:
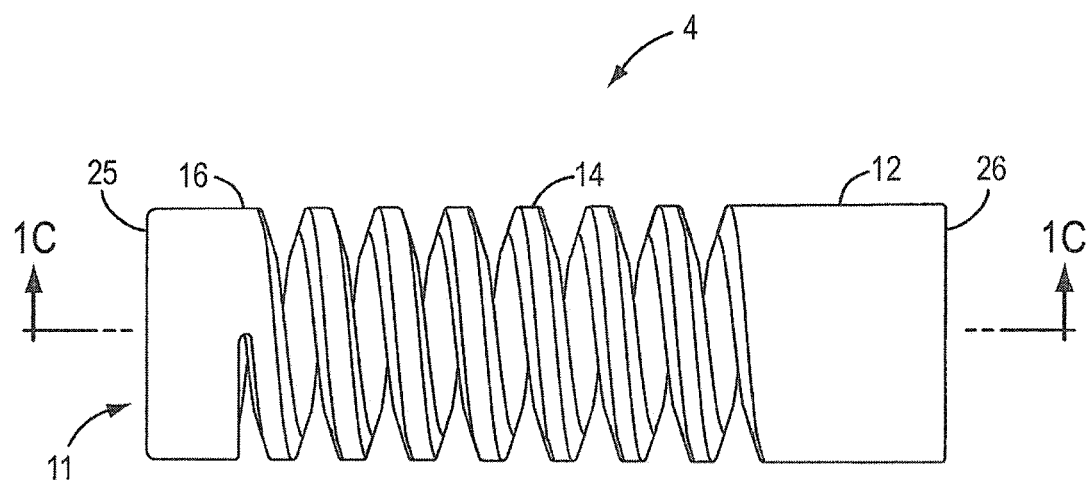
FIG. 1A is a perspective view of a device according to one embodiment of the invention, the device including a neck portion, coil portion, and terminal portion.
Figure 1B:
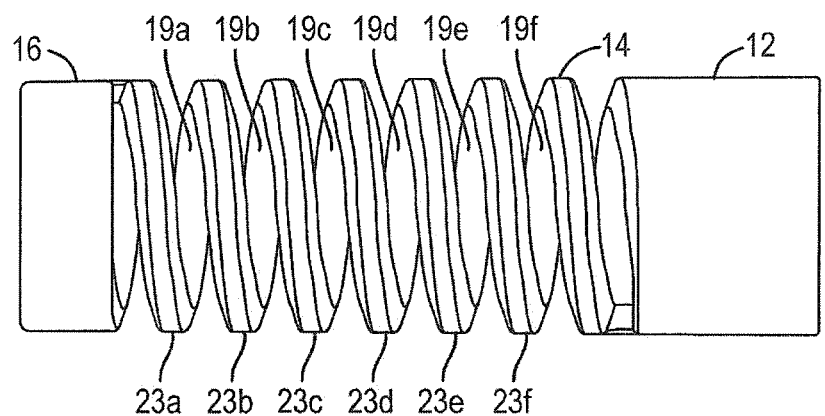
FIG. 1B is a perspective view of the device of FIG. 1A, rotated 90 degrees.
Figure 1C:
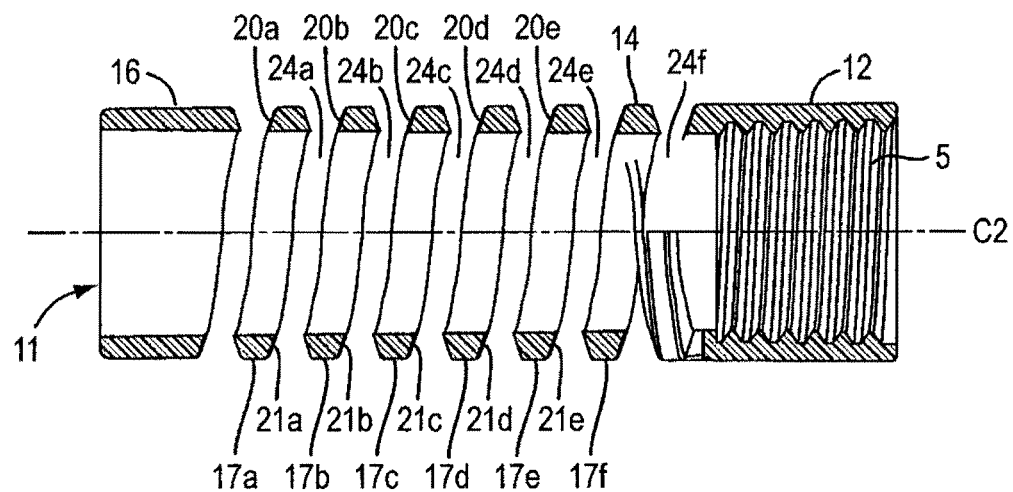
FIG. 1C is a longitudinal cross-sectional view of the device of FIG. 1A.

The present invention is directed to a device applied to a hose that can reduce the likelihood of kinking of the hose, and in particular will reduce kinking of a hose portion adjacent to a faucet or at the base of the device, when a strain has been placed on the hose, such as when the hose is pulled at an angle. As shown in the embodiment of FIGS. 1A-C, the anti-kinking device 4 is a substantially cylindrical body having a through bore 11 and including a neck portion 12 at one end 26; a terminal portion 16 at the opposing end 25; and a central coil portion 14 connecting the neck portion 12 and the terminal portion 16. The device has a central cylindrical axis C2. As shown in FIGS. 1C, 1E, and 1F, the neck portion 12 has a threaded internal surface 5, here more specifically a helical threaded internal surface. In an alternative embodiment, the neck portion can have a grooved or corrugated internal surface, e.g., parallel concentric rings. However, the helical threaded internal surface 5 is preferred because it provides more surface contact area for attachment to the plurality of parallel concentric rings of a ferrule. Also, rotation of the helical threaded internal surface of the device and the rings of the ferrule will move the device up (longitudinally along the cylindrical axis of) the ferrule, e.g., by using a twisting motion, to provide a tighter attachment to the ferrule.

Figure 8A:
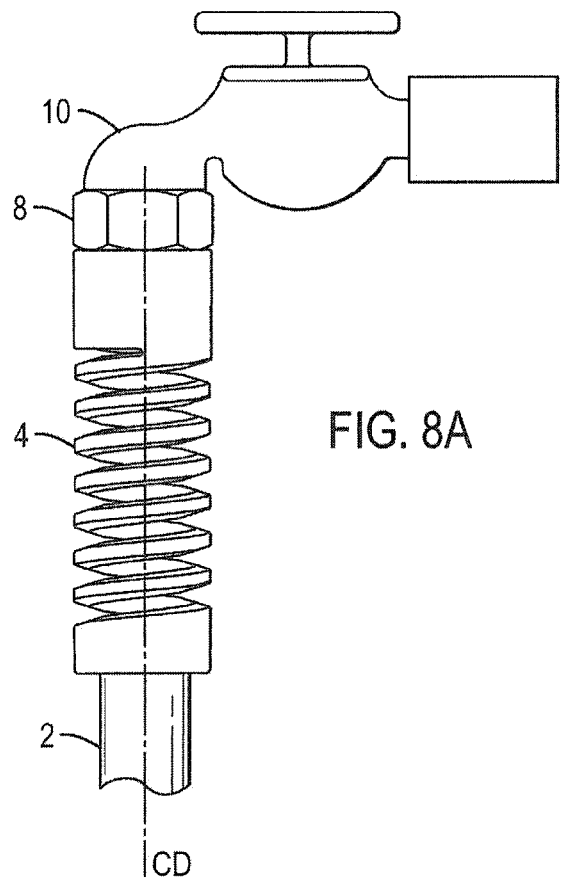
FIG. 8A is a perspective view of the fully assembled hose system of FIG. 7 attached via the coupler to a faucet, wherein no strain has been placed upon the hose.
Figure 8B:
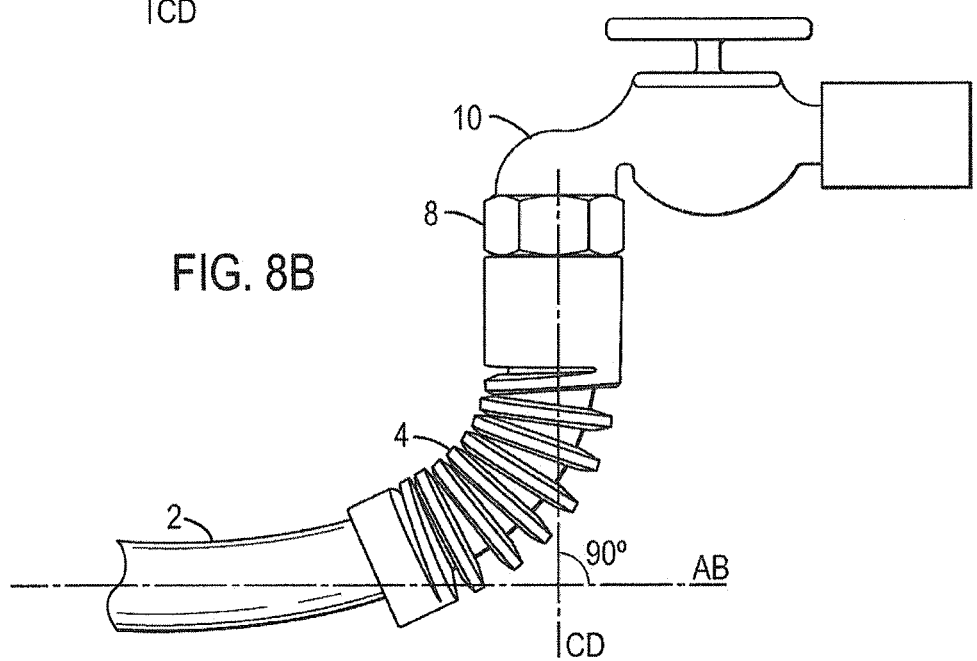
FIG. 8B is a perspective view of the fully assembled hose system of FIG. 7, wherein a strain has been placed upon the hose and wherein the device prevents kinking of the bent hose.

As shown in FIGS. 1A-C, the coil portion 14 has a central axis C2 and comprises a plurality of spaced apart windings, e.g., 17a, 17b, 17c, etc. with open spaces, e.g., 24a, 24b, 24c, etc between the windings. Each winding has a substantially cylindrical inner wall 19, a substantially cylindrical outer wall 23 concentric with the inner wall, and sidewalls 20, 21 connecting the inner and outer walls. The sidewalls having planar angled portions with respect to the coil axis. More specifically, the opposing sidewalls are oppositely angled so as to converge toward the outer wall, such that the outer wall is of a lesser length than the inner wall. The planar angled portion of the sidewalls prevents the windings from slipping against each other and causing the device to lose its shape, as occurs with the prior art circular wirings. In particular, the planar angled portions of the adjacent windings engage each other to reduce the strain being placed on the hose. A cross-sectional view of a winding has the general shape of a trapezoid, wherein the inner and outer wall are roughly parallel to each other, the angles formed between the sidewalls and the inner wall are acute, and the angles formed between the planar angled sidewalls and the outer wall are obtuse, and the sidewalls converge radially going from the (longer) inner wall toward the (shorter) outer wall. The corners of the inner walls act like hinge points when the coil portion is bent, i.e., the adjacent corners of two adjacent coils will meet and the adjoining sidewalls will converge and nest one alongside the other as shown in FIG. 8B.

The coil windings are thus designed to nest along their outer walls and prevent the collapse or kinking of the hose portion located inside the device. In particular, as shown in FIG. 8A, when no strain is placed on the hose (the hose is linear), the coil windings are in a relaxed state (linear, spaced apart relation) along axis line CD. However, as shown in FIG. 8B, when a strain is placed upon the hose along axis line AB, then the angled portion of the sidewalls of device 4 engage each other to prevent the hose 2, which has been inserted through the device 4, from kinking either near the faucet or at the end of the terminal portion of the device.

Figure 1D:
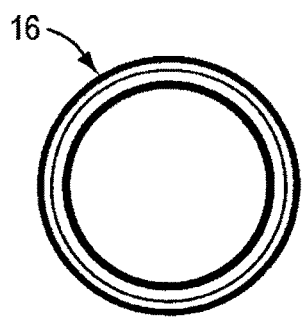
FIG. 1D is an end view of the terminal portion of the device of FIG. 1A.
Figure 1E:
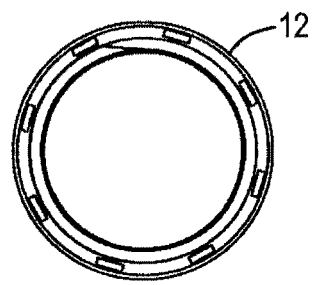
FIG. 1E is an end view of the neck portion of the device of FIG. 1A.
Figure 1F:
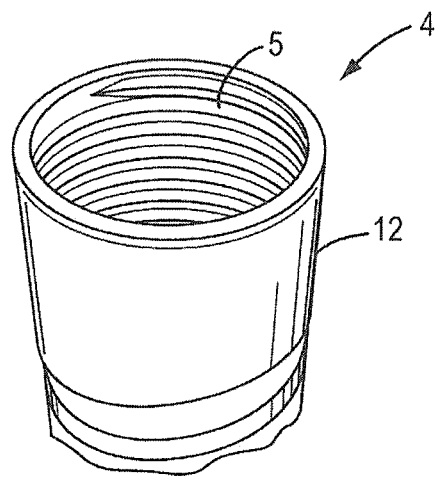
FIG. 1F is a perspective view showing the neck portion of the device of FIG. 1A having a threaded internal surface.

As shown in FIG. 1D, the terminal portion 16 of the device can be smooth on both the outside and inside surfaces. The device can have substantially the same inner diameter throughout the length of the device. The size of the inner diameter is not particular to the device, so long as a hose can be inserted there through and the neck portion of the device can attach onto a ferrule at an end of the hose. In particular, the threaded internal surface of the neck portion of the device can engage the plurality of parallel concentric rings on the outer surface of a ferrule. In other aspects, the device can be tapered toward the terminal portion or toward the neck portion.

The device can be made from durable materials that will withstand temperature and weather changes. In an aspect, the device is made from synthetic polymers, such as nylon and plastics, including thermosetting and thermoplastics, selected from the group consisting of acrylonitrile butadiene styrene (ABS), nylon, acrylics, celluloid, cellulose acetate, cyclic olefin copolymer, ethylene-vinyl acetate (EVA), ethylene vinyl alcohol (EVOH), fluoroplastics, polyacrylates, polyacrylonitriles, polyamides, polyamide-imide, polyaryletherketone, polybutadiene, polybutylene, polybutylene terephthalate, polycaprolactone, polychlorotrifluoroethylene, polycarbonate, polyester, polyethylene, polyetherimide, polyethersulfone, polyimide, polyphenylene oxide, polypropylene, polystyrene, polysulfone, polyurethane, polyvinyl acetate, polyvinyl chloride, polyvinylidene chloride, and styrene-acrylonitrile. Any plastic material with or without other nonplastic fillers may be used, so long as the coil windings are flexible and will bend along with the hose when a bending force, e.g., a strain, is applied to the hose.

The device disclosed herein can be used in a hose system. The hose system can comprise a hose, at least one anti-kinking device, optionally at least one ferrule, and optionally a coupler. In one embodiment, as shown in FIGS. 4-8, the hose system comprises a hose 2, the anti-kinking device 4, a ferrule 6, and a coupler 8. Various permutations of the disclosed hose system are contemplated herein and will be discussed further below.

The hose 2 for use in the disclosed hose system can be flexible and may be made from multi-ply vinyl, rubber, and non-reinforced vinyl. For example, the hose may be made from soft vinyl material, vinyl material, natural rubber, synthetic rubber or thermoplastic rubber. Vinyl materials are known in the art to typically compromise polyvinyl chloride polymers and polyvinyl chloride copolymers. Soft vinyl materials typically comprise polyvinyl chloride and polyvinyl chloride copolymers into which lower molecular weight liquid plasticizers are added so as to increase the elasticity, flexibility and to decrease the hardness of the material, where the most widely used and known plasticizers are derived from phthalate, terephthalate and other ester based liquids. The hose can be cut squarely at one end and any burrs can be removed in order to insert the hose into the anti-kinking device.

As disclosed herein, the hose system can comprise at least one ferrule 6. A ferrule 6 is a sleeve or cap, typically metal that can be used to attach a coupling 8 to a hose 2. The inside diameter of the ferrule 6 should be sized to slip over the hose for which the ferrule is intended. In an aspect, the inner diameter of the ferrule 6 can range from about 0.2" to about 1.0", from about 0.38" to about 0.75", and from about 0.45" to about 0.625". The length of the ferrule 6 can be from about 0.4" to about 1.5", from about 0.5" to about 1.0", and about 0.625" to about 0.72". The size of the hole at the end of the ferrule 6 should be big enough to accept a coupling tail 9.

Figures 2, 3:
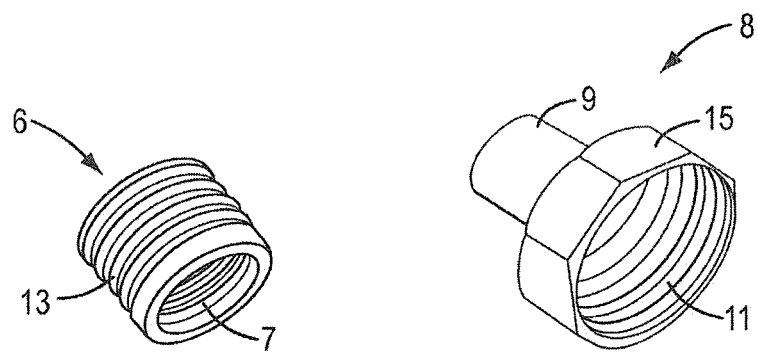
FIG. 2 is a perspective view of a ferrule having a plurality of parallel concentric rings on the inner and outer surfaces.
FIG. 3 is a perspective view of a coupler having a smooth cylindrical tail portion, and a neck portion with a threaded internal surface and hexagonal outer surface.

The internal 7 and outer 13 surface of the ferrule 6 can have a plurality of parallel concentric rings, as shown in FIG. 2. The parallel concentric rings allow the threaded internal surface of the neck portion of the device to grab and move up, e.g., by twisting the device, the ferrule thereby providing a stronger attachment. In an aspect, the internal and outer surface of the ferrule can be smooth.

Figure 11C:
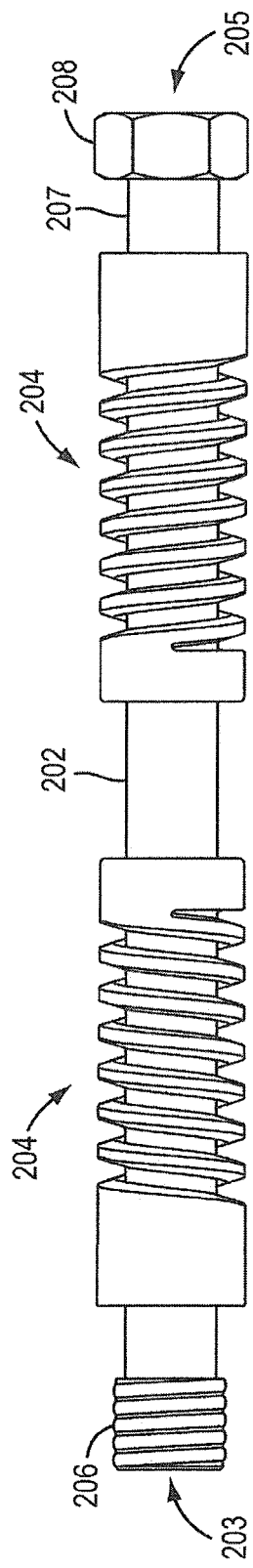
Figure 12A:
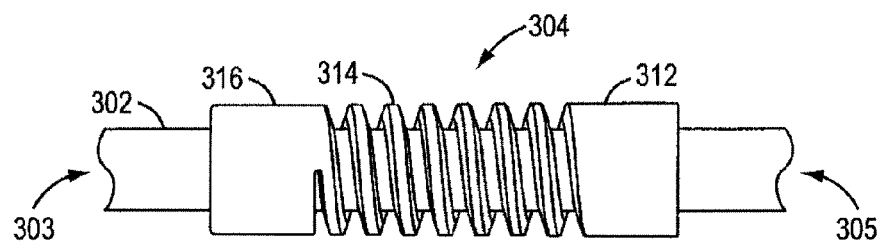
Figure 12B:
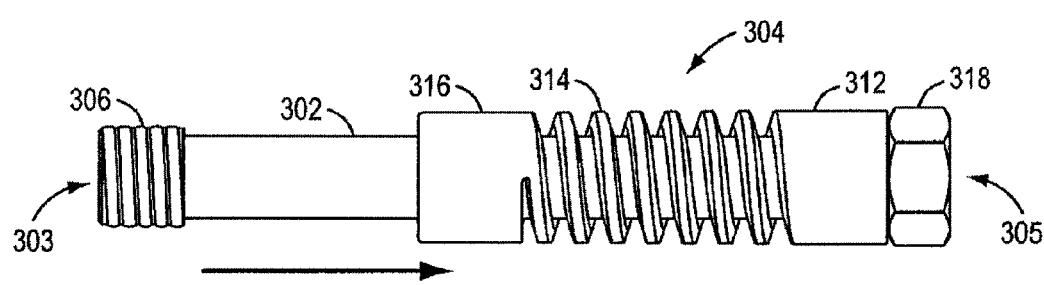
Figure 12C:
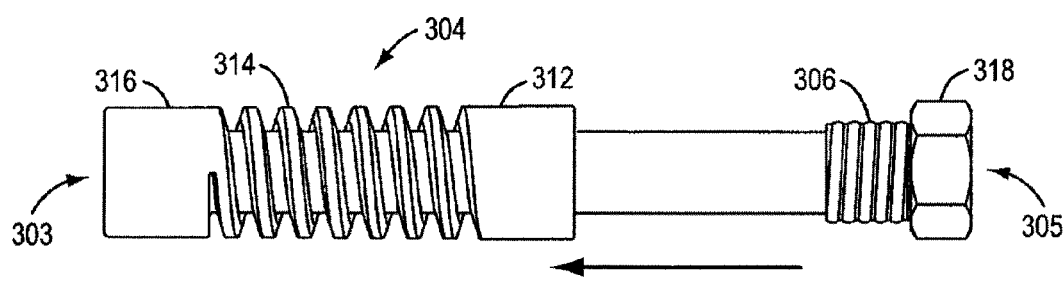

In an embodiment, a ferrule 306 can be present at the female end of the hose 305 and at the male end of the hose 303, as shown in FIGS. 12B-C. In another embodiment, a ferrule 206 can be present at just the male end of the hose 203, as shown in FIG. 11C.

The coupling 8, for use in the disclosed hose system, is a fitting that allows a hose 2 to be fastened either to an additional hose or some type of faucet 10. There are also couplings known as expansion hose fittings that effectively enable a hose of one diameter to couple with a second hose of a larger diameter. As shown in FIG. 3, the outer diameter of the tail 9 of the coupling 8 must be able to slide into the hose 2, for example 7/16 inch, 19/32 inch, 1/2 inch, 5/8 inch, and 3/4 inch. The length of the tail 9 should match the length of the ferrule 6. The coupling 8 can have a threaded internal surface 11 for attachment to a faucet and an outer hexagonal surface of the neck portion 15 of the coupling.

The coupler and the ferrule can be made from any suitable material, such as brass, aluminum, copper, plated steel, steel, and stainless steel. Steel with zinc or nickel plating is also an option. For those applications, where the hose is designed to deliver potable water, lead free brass may be used. The ferrules and couplers may be annealed for ease of crimping.

Figure 4:
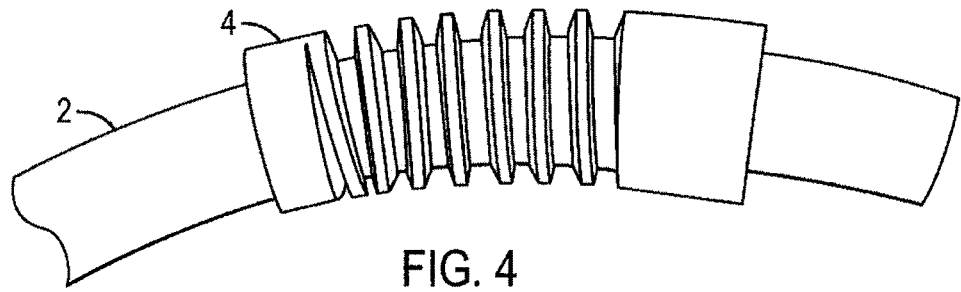
Figure 5:
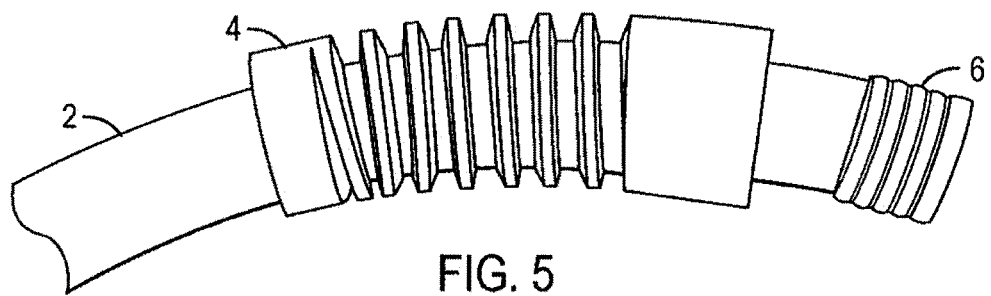
Figure 6:
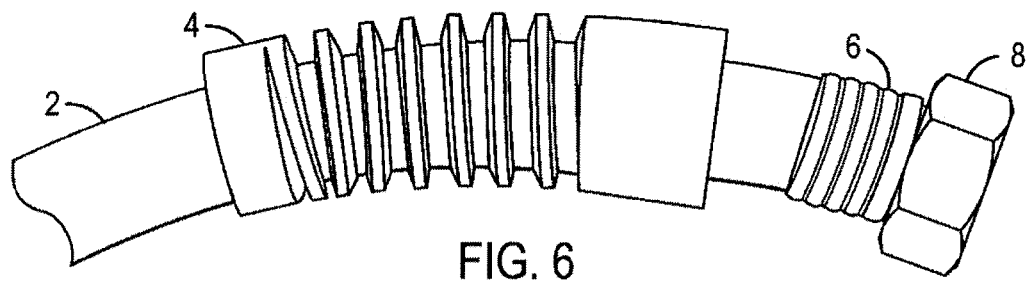

A method of making a hose system, according to one embodiment of the invention, is illustrated in FIGS. 4-7. FIG. 4 illustrates a hose 2 inserted through the device 4 of FIGS. 1A-F. A ferrule 6 is then placed onto an end of the hose, as illustrated in FIG. 5. A coupler 8 having a tail is then inserted into the end of the hose having a ferrule, as illustrated in FIG. 6. The coupler and ferrule are then crimped.

Crimping of ferrules and/or couplings and/or the disclosed device onto hoses can be achieved by any technique known in the art, such as those disclosed in U.S. Pat. No. 4,867,485, the disclosure of which is hereby incorporated by reference. In the embodiment illustrated in FIG. 6, the ferrule 6 and the coupler 8 are placed onto the hose 2. The fingers of a crimping machine are inserted into the hose with the ferrule and coupler in place. The fingers then apply physical pressure to the inside surface of the tail of the coupler thereby deforming some portion of the tail 9 of the coupler 8 and crimping the hose 2 into the inside surface of the ferrule 7, as shown in FIG. 2. The crimping is done in a corrugated fashion, i.e., there are areas of greater and lesser compression.

Figure 7:
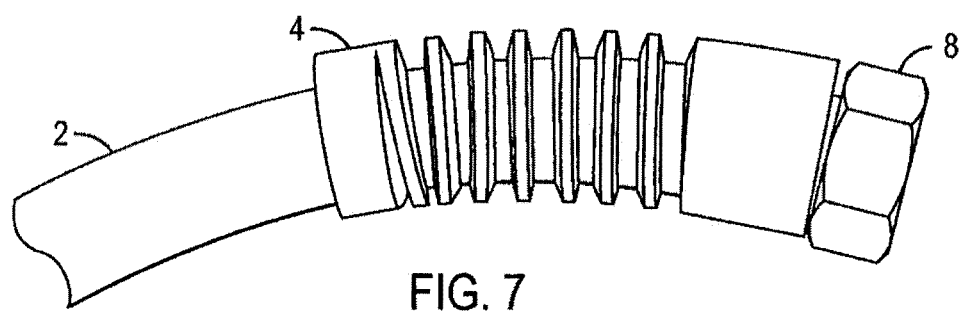

After crimping the coupler 8 and ferrule 6 onto the hose 2, the neck portion of the device 4 is then moved up and over the outer surface of the ferrule, as shown in FIG. 7. In particular, the threaded internal surface of the device can engage the parallel concentric rings on the outer surface of a ferrule 6, as shown in FIGS. 6-7. In an aspect, the device can be twisted onto the ferrule thereby allowing the threaded internal surface to move up and over the parallel concentric rings. In this manner, the device can be "attached" to the ferrule when in use and can be unattached from the ferrule when it is no longer needed.

Figure 9A:
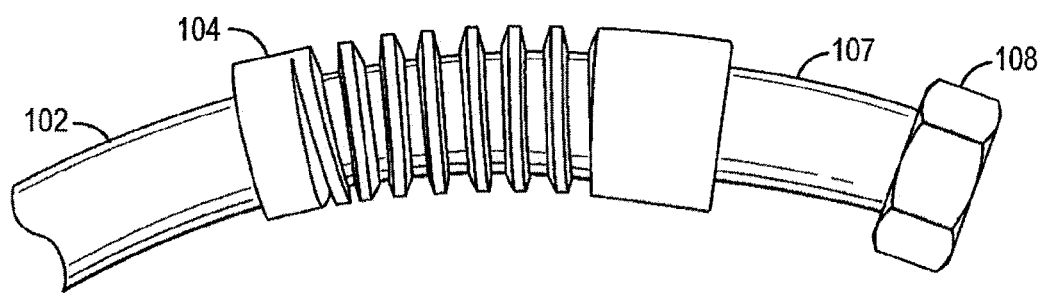
FIG. 9A is a perspective view of a hose system, according to another embodiment of the invention, showing a hose inserted through the device of FIG. 1A, with a coupler inserted into the end of the hose, and without a ferrule.
Figure 9B:
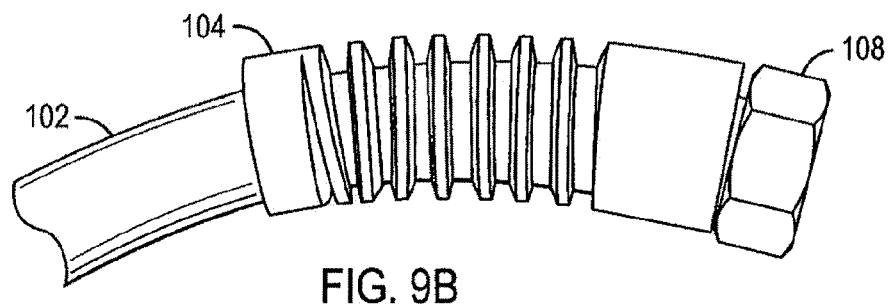
FIG. 9B is a perspective view of the hose system according to another embodiment of the invention, showing an anti-kinking device and a coupler fully attached on the end of the hose, but without a ferrule present.

In another embodiment for making a hose system, a hose system comprising a hose, the anti-kinking device, and a coupler, is shown in FIGS. 9A-B. The hose 102 is inserted through the device 104, and a coupler 108 is inserted into one end of the hose, without the presence of a ferrule 107. The device 104 is then slid up the hose towards the base of the outer surface of the coupler. The coupler, hose, and device are then crimped such that the outward expansion of the hose and tail of the coupler during the crimping process create a friction fit thereby holding the anti-kinking device in place at one end of the hose. In this embodiment, the device cannot be moved, i.e, slid up and down the hose, as in the first embodiment. This embodiment provides a cost savings and increased time efficiency during manufacture by eliminating the time and expense of installing a ferrule at the female end of the hose.

Figure 10A:
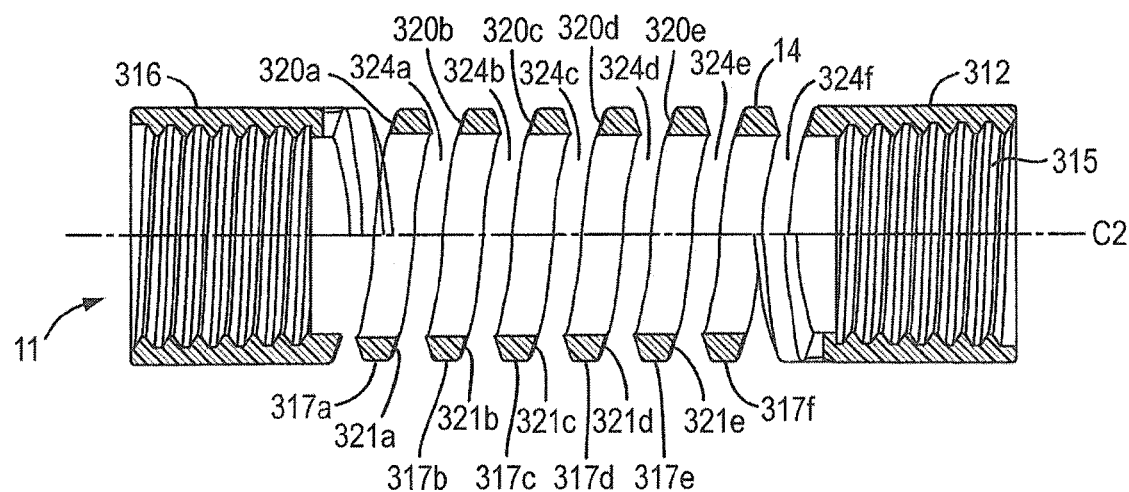
FIG. 10A is a longitudinal cross-sectional view of an anti-kinking device according to another embodiment of the invention, the device including a neck portion, coil portion, and a terminal portion.
Figure 10B:
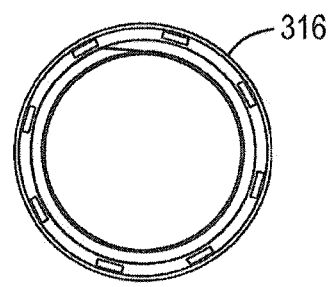
FIG. 10B is an end view of the terminal portion of the device of FIG. 10A.

A typical garden or water hose has a female end and a male end, wherein each end has a ferrule. The present invention therefore contemplates a device 304 wherein both the neck portion 312 and the terminal portion 316 have threaded internal surfaces, as shown in FIGS. 10A-B. The device 304 is a substantially cylindrical body having a through bore 311 and including a neck portion 312 at one end having a threaded internal surface 315; a terminal portion 316 at the opposing end having a threaded internal surface; and a central coil portion 314 connecting the neck portion 312 and the terminal portion 316. The device has a central cylindrical axis C2 and comprises a plurality of spaced apart windings, e.g., 317a, 317b, 317c, etc. with open spaces, e.g., 324a, 324b, 324c, etc between the windings. Each winding has a substantially cylindrical inner wall, a substantially cylindrical outer wall, and sidewalls 320a, 321a connecting the inner and outer walls. The sidewalls having planar angled portions with respect to the coil axis.

A hose system for use with the device 304 of FIG. 10A comprises a hose, at least one ferrule, and the device 304 wherein both the neck portion and the terminal portion have threaded internal surfaces. To make such a hose system, a hose 302 having male end 303 and female end 305 would be inserted through the device 304, as shown in FIG. 12A. The device having a terminal portion 316, a coil portion 314, and a neck portion 312. A ferrule 306 would then be placed onto the female end of the hose 305, and a male end of the hose 303. A coupler 318 would also be placed into the female end of the hose 305. The ferrules and couplers would then be crimped onto the hose. When in use, the device 304, by its neck portion having a threaded internal surface, can be attached onto the ferrule 306 at the female end of the hose 305, as shown in FIG. 12B (the ferrule at the female end of the hose is not visible). The device 304 can then be detached from the ferrule 306 at the female end of the hose, slid down the length of the hose 302, and attached onto the ferrule 306 at the male end of the hose 303 using the terminal portion having a threaded internal surface of the device 304, as shown in FIG. 12C (the ferrule at the male end of the hose is not visible).

Figure 11A:
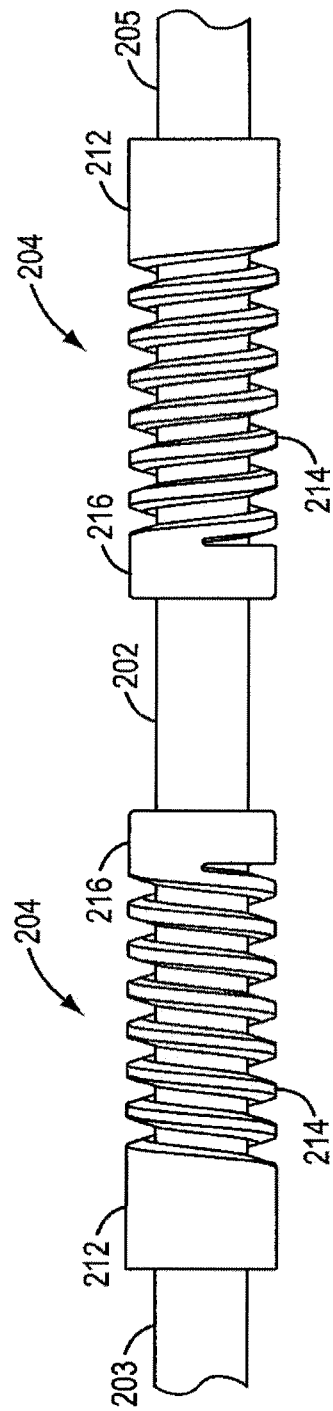
Figure 11B:
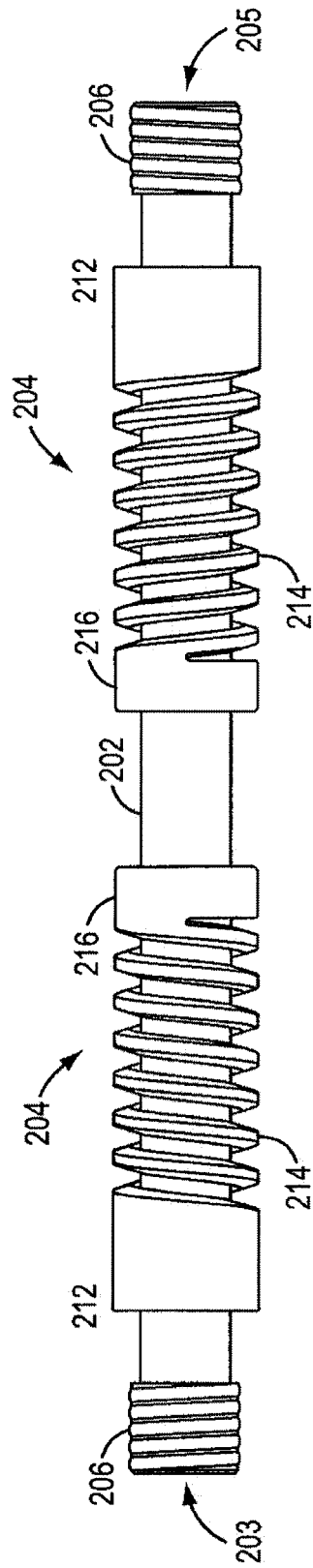
Figure 11D:
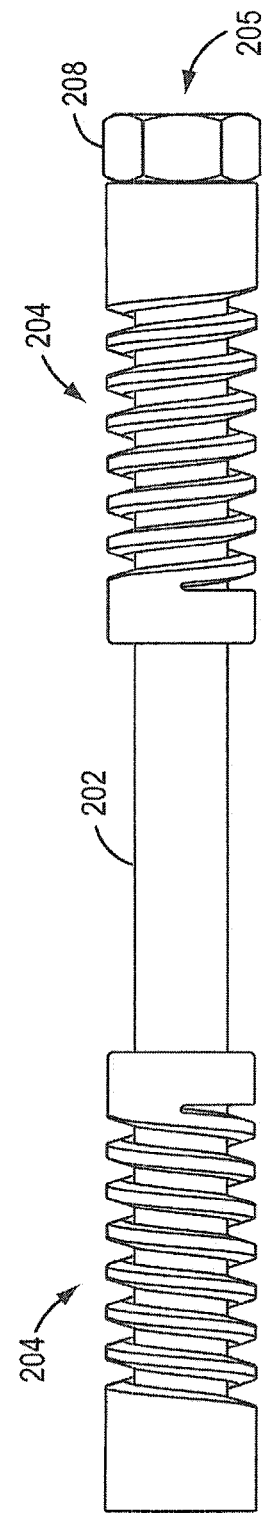

In another embodiment, there is disclosed a hose system comprising a hose 202, at least one of the disclosed devices 204, at least one ferrule 206, and optionally a coupler 208, as shown in FIGS. 11A-D. For example, a hose 202 could be inserted through two devices (204), wherein each device has a neck portion 212 having a threaded internal surface, a coil portion 214, and a terminal portion 216. In this embodiment, the terminal portion 216 of each device 204 should be positioned toward the center of the hose 202 and the neck portion 212 of each device 204 should be positioned toward the female 205 and male 203 ends of the hose 202, as shown in FIG. 11A. A ferrule 206 should be placed onto each end 203, 205 of the hose 202, as shown in FIG. 11B. In an alternative embodiment, a ferrule 206 can be placed on the male end 203 of the hose 202 and a coupler 208 can be placed onto the female end 205 of the hose, wherein the female end of the hose does not have a ferrule 207, as shown in FIG. 11C. The ferrule 206 on the male end 203 of the hose is then crimped. The device 204 on the female end of the hose is slid so that the neck portion abuts the base of the coupler 208 and the two are crimped onto the hose. The device 204 near the male end of the hose is slid down the length of the hose so that the neck portion of the device 204 slides up and over the parallel concentric rings of the ferrule 206 which has been crimped on the male end of the hose 203, as shown in FIG. 11D. In this embodiment, the hose 202 is prevented from kinking as a result of a strain placed on the hose at both the female and male ends.

Figure 13:
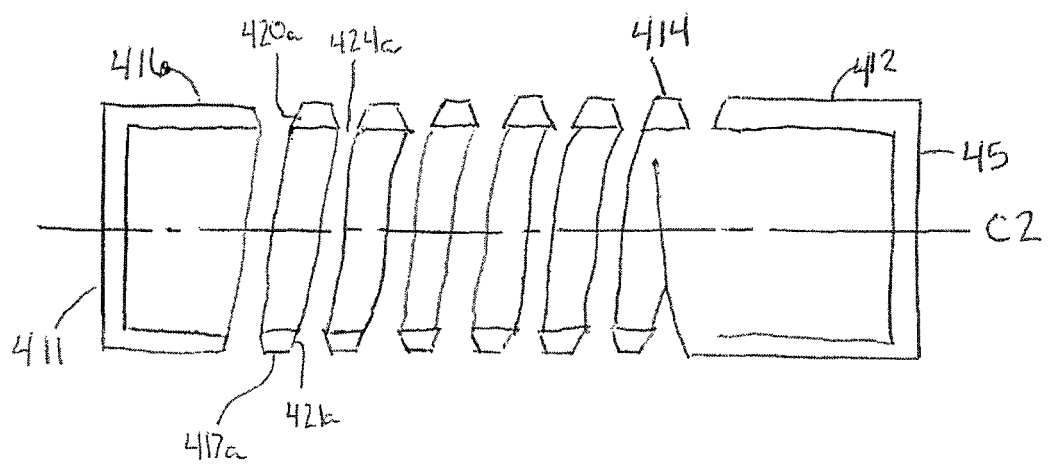
FIG. 13 is a longitudinal cross-sectional view of an anti-kinking device according to another embodiment of the invention, the device including a neck portion, coil portion, and a terminal portion.

In a further embodiment as shown in FIG. 13, there is disclosed an anti-kinking device comprising a neck portion 412, a coil portion 414 connecting the neck portion 412 and a terminal portion 416; wherein the coil portion 414 has a central coil axis C2 and comprises a plurality of spaced apart windings 417a with open spaces 42a between each winding in a relaxed state, each winding having a substantially cylindrical inner wall, a substantially cylindrical outer wall, and sidewalls 420a, 421a connecting the inner and outer walls, the sidewalls having planar angled portions with respect to the coil axis; wherein the device is a substantially cylindrical body having a through bore 411; and wherein the planar angled portions of the sidewalls engage to prevent the windings from slipping against each other when the windings are in a bent state. In particular, the neck portion has a smooth internal surface.

As can be seen, the disclosed hose system can comprise various components, such as a hose, at least one device, optionally at least one ferrule, and optionally a coupler. Any and all permutations on the above-described embodiments are contemplated.

While specific embodiments of the present invention have been shown and described, it should be apparent that many modifications can be made thereto without departing from the spirit and scope of the invention. Accordingly, the invention is not limited by the foregoing description, but is only limited by the scope of the claims appended thereto.

We claim:

1. A hose system comprising:
a hose having a female end and a male end and inserted through a device comprising:
   a neck portion having a threaded internal surface; and
   a coil portion connecting the neck portion and a terminal portion having a threaded internal surface;
   wherein the coil portion has a central coil axis and comprises a plurality of spaced apart windings with open spaces between each winding in a relaxed state, each winding having a substantially cylindrical inner wall, a substantially cylindrical outer wall, and sidewalls connecting the inner and outer walls, the sidewalls having planar angled portions with respect to the coil axis; and
a coupler having a tail inserted in the female end of the hose;
a first ferrule having a plurality of parallel concentric rings on an outer surface of the first ferrule, the coupler tail being deformed to crimp the end of the hose between the coupler tail and an inside surface of the first ferrule;
a second ferrule having a plurality of parallel concentric rings on an outer surface of the second ferrule, the second ferrule being crimped onto the male end of the hose;
wherein the threaded internal surface of the neck portion of the device is configured to be releasably attached to the plurality of parallel concentric rings on the outer surface of the first ferrule and
wherein the threaded internal surface of the terminal portion of the device is configured to be releasably attached to the plurality of parallel concentric rings on the outer surface of the second ferrule.

2. The hose system of claim 1 wherein the inside surface of at least one of the first and second ferrules also has a plurality of parallel concentric rings wherein the hose is crimped into the rings in the inside surface of the at least one ferrule.

3. The hose system of claim 1 wherein at least one of the first and second ferrules has an inner diameter within a range of 0.2" to 1.0".

* * * * *

UNITED STATES PATENT AND TRADEMARK OFFICE
CERTIFICATE OF CORRECTION

| | |
|---|---|
| PATENT NO. | : 9,261,222 B2 |
| APPLICATION NO. | : 13/309164 |
| DATED | : February 16, 2016 |
| INVENTOR(S) | : Lorraine et al. |

Page 1 of 1

It is certified that error appears in the above-identified patent and that said Letters Patent is hereby corrected as shown below:

In the claims

In column 8, line 41 (claim 1):

insert --female-- before "end"

Signed and Sealed this
Tenth Day of May, 2016

Michelle K. Lee
*Director of the United States Patent and Trademark Office*